United States Patent
Naim et al.

(10) Patent No.: US 9,893,775 B1
(45) Date of Patent: Feb. 13, 2018

(54) SYSTEMS AND METHODS FOR IMPLEMENTING AN ENHANCED MULTI-ANTENNA TRANSMISSION SCHEME

(71) Applicant: Sprint Spectrum LP, Overland Park, KS (US)

(72) Inventors: Muhammad Ahsan Naim, Ashburn, VA (US); Yu Zhou, Herndon, VA (US); Luca Zappaterra, Eindhoven (NL)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/375,399

(22) Filed: Dec. 12, 2016

(51) Int. Cl.
*H04W 72/00* (2009.01)
*H04B 7/04* (2017.01)
*H04B 17/336* (2015.01)
*H04W 74/00* (2009.01)

(52) U.S. Cl.
CPC ............. *H04B 7/04* (2013.01); *H04B 17/336* (2015.01); *H04W 74/004* (2013.01)

(58) Field of Classification Search
CPC ...... H04B 7/04; H04B 17/336; H04W 74/004
USPC ..................... 455/450, 452.2, 453
See application file for complete search history.

(56) References Cited

U.S. PATENT DOCUMENTS

| | | | |
|---|---|---|---|
| 8,488,529 B2 | 7/2013 | Sorrentino | |
| 8,730,894 B2* | 5/2014 | Sadri | H04B 7/0857 370/329 |
| 9,232,515 B2 | 1/2016 | Papasakellariou et al. | |
| 2003/0191685 A1* | 10/2003 | Reese | G06F 17/30867 705/14.67 |
| 2006/0176993 A1* | 8/2006 | Kwun | H04B 7/0417 375/367 |
| 2007/0041471 A1* | 2/2007 | Roh | H04L 1/0006 375/299 |
| 2011/0274188 A1* | 11/2011 | Sayana | H04B 7/0639 375/260 |
| 2012/0002750 A1* | 1/2012 | Hooli | H04B 7/0417 375/295 |
| 2012/0170525 A1* | 7/2012 | Sorrentino | H04L 5/0007 370/329 |
| 2014/0241446 A1* | 8/2014 | Zhang | H04B 7/0689 375/260 |
| 2017/0222702 A1* | 8/2017 | Tong | H04B 7/0456 |

* cited by examiner

*Primary Examiner* — Khai M Nguyen

(57) ABSTRACT

Systems and methods are described for enhanced multi-antenna transmission. At a multi-antenna system of a first access node, implicit transmit symbols are assigned to a plurality of antennas. At least two antennas are selected from the plurality of antennas to simultaneously transmit explicit symbols to a wireless device. The explicit symbols are used at the wireless device to decode the implicit transmit symbols.

15 Claims, 8 Drawing Sheets

SYSTEMS AND METHODS FOR IMPLEMENTING AN ENHANCED MULTI-ANTENNA TRANSMISSION SCHEME

TECHNICAL BACKGROUND

As cellular networks develop, the want for high Quality of Service (QoS) coupled with a shortage of wireless spectrum makes it challenging for network operators to meet multiple users' bandwidth and/or throughput demands simultaneously. Heterogeneous Networks (HetNet) implement multiple antenna schemes/technologies at Access Nodes (ANs) and/or wireless devices to exploit multipath propagation behaviors and drastically increase spectral efficiencies through spatial multiplexing (i.e., enabling multiple transmit (Tx) and/or receive (Rx) antennas at ANs and/or wireless devices to transfer data at a same time using separately encoded data signals and/or explicit symbols), which increases signal-capturing power and improves link reliability through the use of transmit diversity (i.e., explicit space-time coding to improve reliability of fading wireless links).

The performance of spatial multiplexing and/or transmit diversity at ANs and/or wireless devices depends strongly on channel properties of a given communication link (e.g., between ANs and/or wireless devices). Because Tx/Rx antennas deployed at ANs and/or wireless devices are arbitrarily selected, ANs and/or wireless devices may select Tx/Rx antennas experiencing degraded channel properties to, for example, send encoded data signals and/or explicit symbols. In such cases, decoding of the data signals and/or explicit symbols at a receiver (e.g., ANs and/or wireless devices) is likely to fail due to poor signal and/or noise conditions, which reduces overall network efficiencies and throughput.

OVERVIEW

Systems and methods are described for implementing an enhanced multi-antenna transmission scheme. For example, two or more antennas of a multi-antenna system that meet a criteria may be selected. The selected two or more antennas may be used to simultaneously transmit at least one explicit symbol to a pre-configured receiver. Implicit information (e.g., transmitted with the explicit symbols and/or based on the selected two or more antennas) may be decoded at the receiver based on the selected antennas.

In another instance, implicit transmit symbols are assigned to a plurality of antennas of the multi-antenna system. At least two antennas are selected from the plurality of antennas to simultaneously transmit explicit symbols to at least one wireless device. The implicit symbols are decoded at the at least one wireless device based on the selected two or more antennas.

DETAILED DESCRIPTION

As wireless networks develop, the want for high Quality of Service (QoS) coupled with a shortage of wireless spectrum makes it challenging for network operators to meet multiple users' bandwidth and/or throughput demands simultaneously. Heterogeneous Networks (HetNet) may use multiple antenna schemes/technologies at Access Nodes (ANs) and/or wireless devices to exploit multipath propagation behaviors and drastically increase spectral efficiencies through spatial multiplexing (i.e., enabling multiple transmit (Tx) and/or receive (Rx) antennas at ANs and/or wireless devices to transfer data at a same time using separately encoded data signals and/or explicit symbols), which increases signal-capturing power and improves link reliability through the use of transmit diversity (i.e., explicit space-time or space frequency block coding to improve reliability of fading wireless links).

ANs and/or wireless devices may need (or want) to communicate implicit information using select Tx/Rx antennas located at the ANs and/or wireless devices. But, the selected Tx/Rx antennas may experience degraded channel properties due to multipath fading. In one embodiment, the ANs and/or wireless devices can use alternative Tx/Rx antennas (e.g., Tx/Rx antennas not experiencing degraded channel properties) to communicate the implicit information to the ANs and/or wireless devices based on the originally selected Tx/Rx antennas to reduce decoding errors. In this manner, overall network efficiencies and throughput may be increased.

Figure 1A:
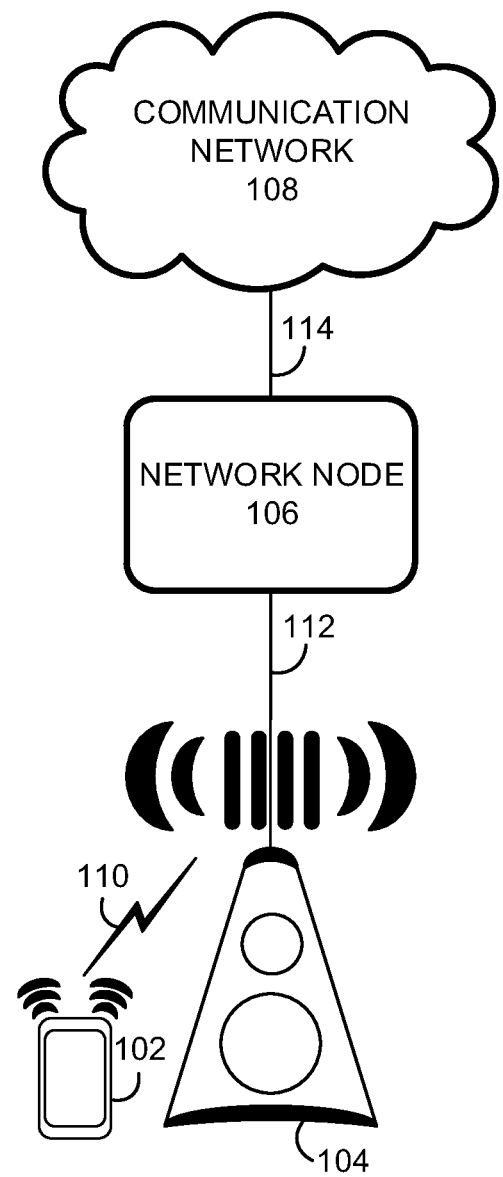
FIG. 1A illustrates an exemplary communication system for implementing an enhanced multi-antenna transmission scheme in a wireless network.
Figure 1B:
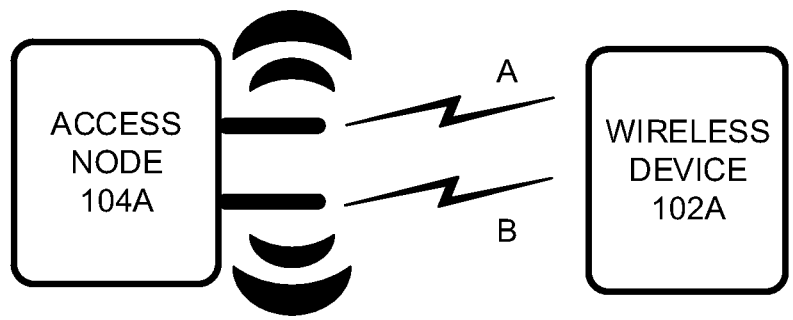
FIG. 1B illustrates an exemplary AN equipped with multiple Tx/Rx antennas using spatial multiplexing.
Figure 1C:
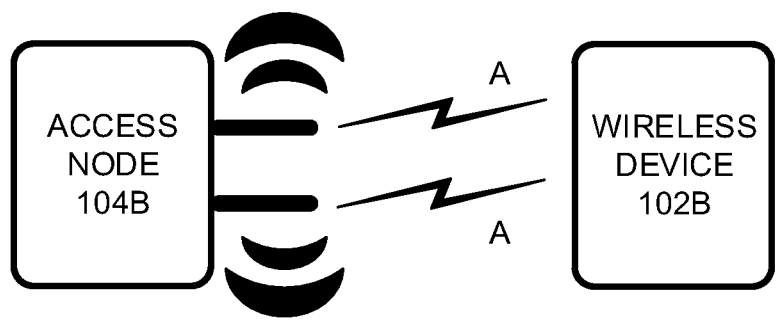
FIG. 1C illustrates an exemplary AN equipped with multiple Tx/Rx antennas using transmit diversity.

For example, referring to FIGS. 1A-1C, multiple Tx/Rx antennas (not shown) may be deployed at ANs 104, 104A, 104B and/or wireless devices 102, 102A, 102B of wireless network 108. Each Tx/Rx antenna provides a signal path from the transmitter (e.g., wireless devices 102, 102A, 102B) to the receiver (e.g., ANs 104, 104A, 104B); spectral efficiencies are obtained by splitting (or dividing) incoming transmit signals and/or data streams into multiple sub-streams and sending (or transmitting) each sub-stream on different Tx/Rx antennas to ANs 104, 104A, 104B and/or wireless devices 102, 102A, 102B. For example, ANs 104, 104A, 104B and/or wireless devices 102, 102A, 102B may use one or more Tx/Rx antennas to transmit signals (e.g., encoded data signals and/or explicit symbols) using different time and/or frequency resources. The transmit signals may be "combined" on a same Resource Block (RB) for UL transmission at Tx/Rx antennas of ANs 104, 104A, 104B and/or wireless devices 102, 102A, 102B (e.g., using spatial multiplexing, illustrated in FIG. 1B) to maximize Signal-to-Interference-Plus-Noise Ratio (SINR), which effectively increases signal-capturing power (i.e., more bits per second per frequency range or Hertz (Hz) of bandwidth) at ANs 104, 104A, 104B and/or wireless devices 102, 102A, 102B to improve link quality and/or reliability (e.g., using transmit diversity, illustrated in FIG. 1C).

Figure 1D:
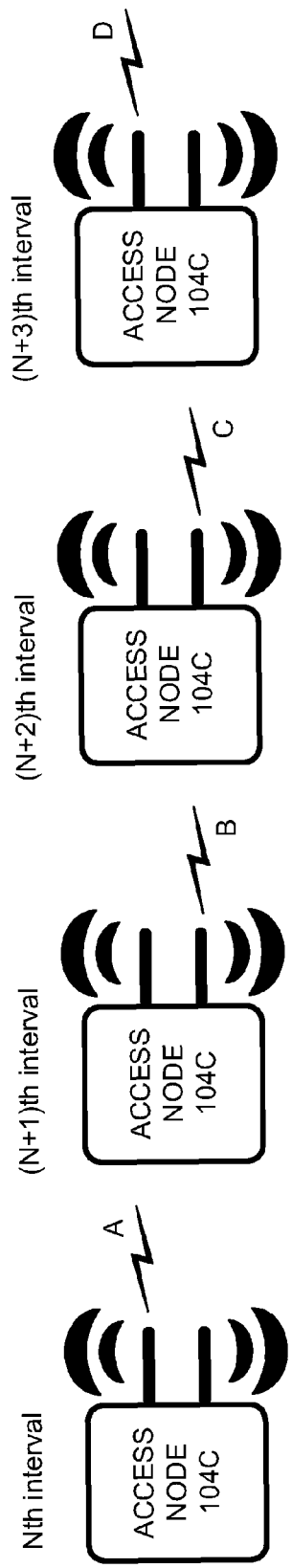
FIG. 1D illustrates an exemplary AN equipped with multiple Tx/Rx antennas configured to transmit encoded data signals and/or explicit symbols from a subset of available antennas.

In another embodiment, illustrated in FIG. 1D, multiple Tx/Rx antennas (not shown) may be deployed at AN 104C and/or wireless devices (not shown) of wireless network 108. AN 104C and/or the wireless devices of wireless network 108 may use a subset (i.e., fewer than all available Tx/Rx antennas at AN 104C and/or individual wireless devices of wireless network 108) of available Tx/Rx antennas to transmit signals (e.g., encoded data signals and/or explicit symbols) at different time intervals (e.g., period of time, at a given time, etc.) such that all available Tx/Rx antennas are not used at a same time. For example, referring to FIG. 1D, AN 104C and/or wireless devices of wireless network 108 may use a subset of available Tx/Rx antennas to transmit signals at $N^{th}$ time interval, $(N+1)^{th}$ time interval, $(N+2)^{th}$ time interval, $(N+3)^{th}$ time interval, etc.; During the time intervals, AN 104C and/or wireless devices of wireless network 108 may transmit encoded data signals and/or explicit symbols "A, B, C, and/or D" to a receiver (e.g., AN 104C and/or wireless devices of wireless network 108). At each time interval (i.e., $N^{th}$, $(N+1)^{th}$, $(N+2)^{th}$, $(N+3)^{th}$, etc.), AN 104C and/or wireless devices of wireless network 108 use one of two Tx/Rx antennas to transmit the explicit symbols A, B, C, and/or D or other encoded data signals (or encoded data signals). That is, at: (i) $N^{th}$ time interval, AN 104C and/or wireless devices of wireless network 108 may use Tx/Rx antenna "0" to transmit explicit symbol "A" to AN 104C and/or wireless devices of wireless network 108; (ii) $(N+1)^{th}$ time interval, AN 104C and/or wireless devices of wireless network 108 may use Tx/Rx antenna "1" to transmit explicit symbol "B" to AN 104C and/or wireless devices of wireless network 108; (iii) $(N+2)^{th}$ time interval, AN 104C and/or wireless devices of wireless network 108 may use Tx/Rx antenna "1" to transmit explicit symbol "C" to AN 104C and/or wireless devices of wireless network 108; and, (iv) $(N+3)^{th}$ time interval, AN 104C and/or wireless devices of wireless network 108 may use Tx/Rx antenna "0" to transmit explicit symbol "D" to AN 104C and/or wireless devices of wireless network 108.

Operating under the assumption that the receiver (e.g., AN 104C and/or wireless devices of wireless network 108) can detect (or determine) an origin (i.e., from which Tx/Rx antenna a given transmit signal originated) for each sent (or transmitted) symbol A, B, C, and/or D, wireless network 108 via AN 104C and/or wireless devices of wireless network 108 may also send implicit information with the explicit symbols (or encoded data signals) from the Tx/Rx antennas. For example, AN 104C and/or wireless devices of wireless network 108 may be pre-configured such that selection of a Tx/Rx antenna by AN 104C and/or wireless devices of wireless network 108 carries implicit information for AN 104C and/or wireless devices of wireless network 108. For example, referring to FIG. 1D, at: (i) $N^{th}$ time interval, AN 104C and/or wireless devices of wireless network 108 may use Tx/Rx antenna "0" to transmit explicit symbol "A" and implicit transmit symbol or bit "0" to AN 104C and/or wireless devices of wireless network 108; (ii) $(N+1)^{th}$ time interval, AN 104C and/or wireless devices of wireless network 108 may use Tx/Rx antenna "1" to transmit explicit symbol "B" and implicit transmit symbol or bit "1" to AN 104C and/or wireless devices of wireless network 108; (iii) $(N+2)^{th}$ time interval, AN 104C and/or wireless devices of wireless network 108 may use Tx/Rx antenna "1" can be used to transmit explicit symbol "C" and implicit transmit symbol or bit "1" to AN 104C and/or wireless devices of wireless network 108; and, (iv) $(N+3)^{th}$ time interval, AN 104C and/or wireless devices of wireless network 108 may use Tx/Rx antenna "0" to transmit explicit symbol "D" and implicit transmit symbol or bit "0" to AN 104C and/or wireless devices of wireless network 108.

The maximum number of "bits" that can be sent (or transmitted) implicitly is $\log_2 N$, where N is a total number of Tx/Rx antennas at the sender (e.g., AN 104C and/or wireless device 102). For example, referring to FIG. 1E, with a four-antenna Tx/Rx transmitter (e.g., AN 104D and/or wireless device 102D), each Tx/Rx antenna can transmit two implicit transmit symbols or bits based on a selection of Tx/Rx antennas. That is, AN 104D and/or wireless device 102D may select a Tx/Rx antenna to send (or transmit) explicit symbols (or encoded data signals) A, B, C, and/or D based on implicit transmit symbols or bits "00", "01", "10", and/or "11" the sender (e.g., AN 104D and/or wireless device 102D) wants to communicate to the receiver (e.g., AN 104D and/or wireless device 102D). If AN 104D and/or wireless device 102D needs (or wants) to communicate implicit transmit symbols or bits: (i) "00" to AN 104D and/or wireless device 102D, AN 104D and/or wireless device 102D may select Tx/Rx antenna "0" to transmit explicit symbol "A" and/or implicit transmit symbol or bits "00"; (ii) "01" to AN 104D and/or wireless device 102D, AN 104D and/or wireless device 102D may select Tx/Rx antenna "1" to transmit explicit symbol "B" and/or implicit transmit symbol or bits "01"; (iii) "10" to AN 104D and/or wireless device 102D, AN 104D and/or wireless device 102D may select Tx/Rx antenna "2" to transmit explicit symbol "C" and/or implicit transmit symbol or bits "10"; (iv) "11" to AN 104D and/or wireless device 102D, AN 104D and/or wireless device 102D may select Tx/Rx antenna "3" to transmit explicit symbol "D" and/or implicit transmit symbol or bits "11".

The performance of spatial multiplexing and/or transmit diversity at ANs and/or wireless devices depends strongly on channel properties of a given communication link (e.g., between ANs and/or wireless devices, etc.). Because Tx/Rx antennas deployed at ANs 104, 104A, 104B, 104C, 104D, 104E and/or wireless devices 102, 102A, 102B, 102D, 102E are (or can be) arbitrarily selected, ANs 104, 104A, 104B, 104C, 104D, 104E and/or wireless devices 102, 102A, 102B, 102D, 102E may select Tx/Rx antennas with degraded channel properties during sending (or transmission) of transmit signals (e.g., encoded data signals, explicit symbols, and/or implicit transmit symbols or bits) using different time and/or frequency resources. In such cases, decoding of the transmit signals at a receiver (e.g., ANs 104, 104A, 104B, 104C, 104D, 104E and/or wireless devices 102, 102A, 102B, 102D, 102E) is likely to fail due to poor signal and/or noise conditions, which reduces overall network efficiencies and throughput. For example, referring to FIG. 1E, channel conditions associated with Tx/Rx antenna "2" may degrade due to multipath fading. While under multipath fading, AN 104D and/or wireless device 102D may select Tx/Rx antenna "2" to send (or transmit) an explicit symbol "A" and/or implicit transmit symbols or bits "10" to AN 104D and/or wireless device 102D, which results in decoding errors at AN 104D and/or wireless device 102D due to the poor channel conditions between Tx/Rx antenna "2" at AN 104D and/or wireless device 102D.

In some instances, AN 104E and/or wireless device 102E may need (or want) to communicate (or transmit) implicit transmit symbols or bits "10" to AN 104E and/or wireless device 102E, while Tx/Rx antenna "2," which corresponds to implicit transmit symbols or bits "10," is experiencing degraded channel properties due to multipath fading. AN 104E and/or wireless device 102E may select multiple, alternative Tx/Rx antennas (i.e., Tx/Rx antennas other than the Tx/Rx antenna "2" experiencing degraded channel properties) to simultaneously transmit explicit symbols (e.g., "A" and/or "B"). The multiple, alternative Tx/Rx antennas may be selected from available Tx/Rx antennas at AN 104E and/or wireless device 102E based on a binary sum (e.g., 0+0=0, 0+1=1, 1+0=1, 1+1=0) of implicit transmit symbols or bits that equals a sum of implicit transmit symbols or bits corresponding to the Tx/Rx antenna "2" experiencing degraded channel properties due to multipath fading. For example, referring to FIG. 1F, Tx/Rx antenna "2" with binary, implicit transmit symbols or bits "10" experiences degraded channel properties due to multipath fading. AN 104E and/or wireless device 102E needs (or wants) to implicitly transmit bits "10" to AN 104E and/or wireless device 102E; AN 104E and/or wireless device 102E selects Tx/Rx antennas "1" and "3" as a "bit by bit" binary sum of Tx/Rx antenna "1" and Tx/Rx antenna "3" (i.e., {0,1}±{1, 1}={1,0}), which corresponds to implicit bits "10" of Tx/Rx antenna "2". Similarly, implicit bits "01" can be transmitted by the binary sum of Tx/Rx antenna "2" and "3". Implicit bits "11" can be transmitted by the binary sum of Tx/Rx antenna "1" and "2". Implicit bits "00" can be transmitted by the binary sum of Tx/Rx antenna "1", "2", and "3". In this manner, overall network efficiencies and throughput may be increased, while reducing decoding errors at a receiver (e.g., AN 104E and/or wireless device 102E).

Figure 1E:
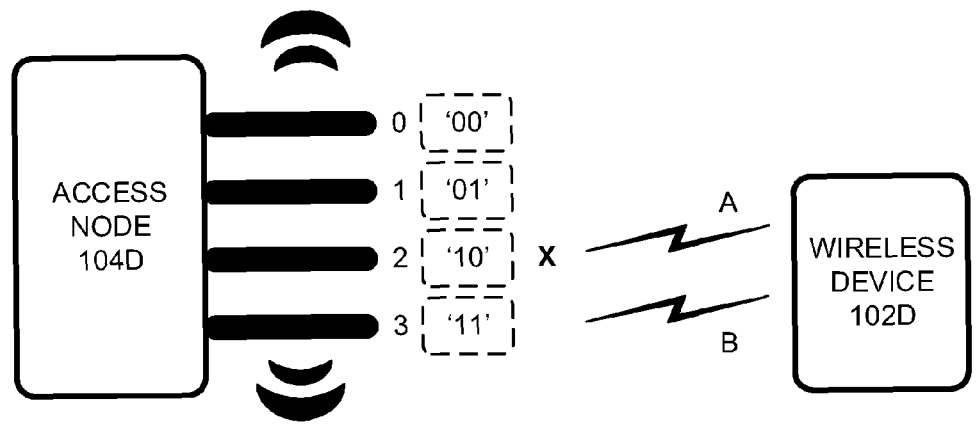
FIG. 1E illustrates an exemplary AN equipped with four Tx/Rx antennas
Figure 1F:
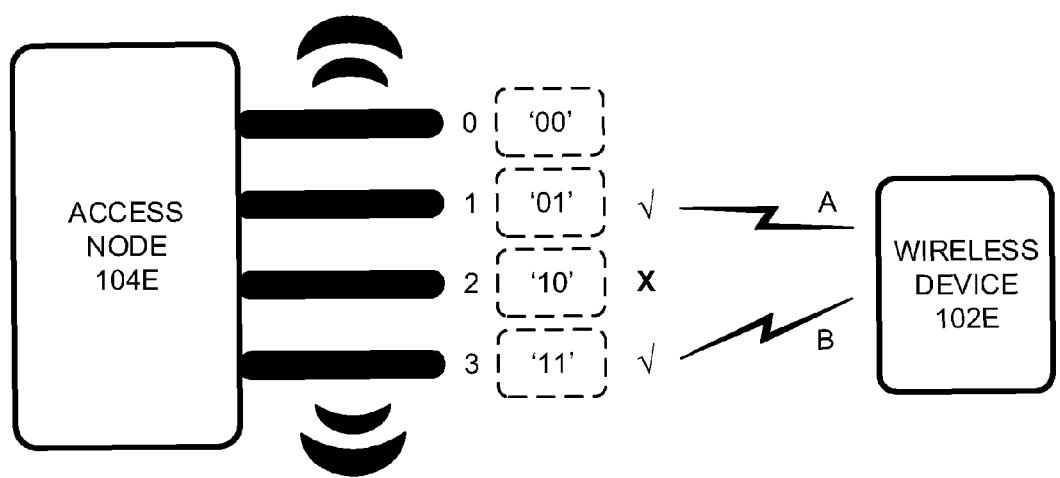
FIG. 1F illustrates another exemplary AN equipped with four Tx/Rx antennas.

FIG. 1A illustrates an exemplary communication system 100 for implementing an enhanced multi-antenna transmission scheme in a wireless network. FIG. 1B illustrates an AN of the exemplary communication system 100 illustrated in FIG. 1A with multiple Tx/Rx antennas using spatial multiplexing. FIG. 1C illustrates an AN of the exemplary communication system 100 illustrated in FIG. 1A with multiple Tx/Rx antennas using transmit diversity. FIG. 1D illustrates an exemplary AN of the exemplary communication system 100 illustrated in FIG. 1A equipped with multiple Tx/Rx antennas configured to transmit encoded data signals and/or explicit symbols from a subset of available antennas. FIGS. 1E and 1F illustrates exemplary ANs of the exemplary communication system 100 illustrated in FIG. 1A equipped with four Tx/Rx antennas. System 100 can comprise wireless devices 102, 102A, 102B, 102D, 102E, ANs 104, 104A, 104B, 104C, 104D, 104E, network node 106, and wireless network 108. Other network elements may be present in the system 100 to facilitate communication but are omitted for clarity, such as controller nodes, base stations, base station controllers, gateways, Mobile-Switching Centers (MSC), Dispatch Application Processors (DAP), and location registers such a Home Location Register (HLR) or Visitor Location Register (VLR). Furthermore, other network elements may be present to facilitate communication between ANs 104, 104A, 104B, 104C, 104D, 104E and wireless network 108, which are omitted for clarity, including additional processing nodes, routers, gateways, and physical and/or wireless data links for carrying data among the various network elements.

Wireless devices 102, 102A, 102B, 102D, 102E can be any device configured to communicate over system 100 using a wireless interface. For example, wireless devices 102, 102A, 102B, 102D, 102E can include a remote terminal unit, a cell phone, a smart phone, a computing platform such as a laptop, palmtop, or a tablet, a Personal Digital Assistant (PDA), or an internet access device, and combinations thereof. It is noted that while one wireless devices 102 is illustrated in FIG. 1A as being in communication with AN 104, any number of wireless devices can be implemented according to various exemplary embodiments disclosed herein.

Wireless devices 102, 102A, 102B, 102D, 102E can transmit and/or receive information over system 100 using various communication services. These services can include various voice, data, and/or Multimedia Broadcast Multicast Service (MBMS) services and applications. For example, mobile voice services, mobile data services, Push-to-Talk (PTT) services, internet services, web-browsing, email, pictures, picture messaging, video, video messaging, broadcast video, audio, voicemail, music MP3's, ring tones, stock tickers, news alerts, etc.

ANs 104, 104A, 104B, 104C, 104D, 104E can be any network node configured to provide communication between wireless devices 102, 102A, 102B, 102D, 102E and wireless network 108. ANs 104, 104A, 104B, 104C, 104D, 104E can be short-range ANs or standard ANs. A short-range AN could include a microcell base station, a picocell base station, a femtocell base station, or the like; a standard AN could include a base transceiver station, a radio base station, an eNodeB device, or an enhanced eNodeB device, or the like. Multiple Tx/Rx antennas may be deployed at ANs 104, 104A, 104B, 104C, 104D, 104E and/or wireless devices 102, 102A, 102B, 102D, 102E of wireless network 108. ANs 104, 104A, 104B, 104C, 104D, 104E may be configured to control the multiple Tx/Rx antennas using multiple antenna schemes/technologies to be adopted by wireless devices 102, 102A, 102B, 102D, 102E, according to scheduling decisions (e.g., made at a scheduling module of ANs 104, 104A, 104B, 104C, 104D, 104E and/or other network element of wireless network 108). For example, ANs 104, 104A, 104B, 104C, 104D, 104E may communicate scheduling decisions (e.g., DL scheduling assignments) to wireless devices 102, 102A, 102B, 102D, 102E using Downlink Control Information (DCI) carried by a Downlink Control Channel (PDCCH). The DCI DL scheduling assignments may include, for example, Physical Downlink Shared Channel (PDSCH) resource indication, a transport format, hybrid-ARQ information, control information (e.g., related to multiplexing), command for power control of the Physical Uplink Control Channel (PUCCH), uplink scheduling grants, Physical Downlink Shared Channel (PUSCH) resource indication, transport format (e.g., an index to a predefined table of Modulation and Coding Schemes (MCS), which may be QPSK, QAM16, QAM64, etc.), etc. ANs 104, 104A, 104B, 104C, 104D, 104E may further include, for example: a higher Media Access Control (MAC) stack module configured to schedule wireless devices 102, 102A, 102B, 102D, 102E based on Channel State Information (CSI) sent to ANs 104, 104A, 104B, 104C, 104D, 104E from wireless devices 102, 102A, 102B, 102D, 102E via the multiple Tx/Rx antennas; a lower MAC stack module configured to perform data handling functions (e.g., multiplexing, de-multiplexing, modulation, and/or de-modulation) of the transmit signals sent to ANs 104, 104A, 104B, 104C, 104D, 104E from wireless devices 102, 102A, 102B, 102D, 102E via the multiple Tx/Rx antennas; and, pre-coding stack module configured to transmit the multiple transmit signals from ANs 104, 104A, 104B, 104C, 104D, 104E to wireless devices 102, 102A, 102B, 102D, 102E based on a pre-coding weight (e.g., determined using Pre-Coding Matrix Information (PMI)) via the multiple Tx/Rx antennas. It is noted that while one AN 104 is illustrated in FIG. 1A, any number of ANs can be implemented within system 100.

Network node 106 can be any network node configured to communicate information and/or control information over system 100. For example, network node 106 can receive information from or transmit information to wireless devices 102, 102A, 102B, 102D, 102E over system 100. For ease of illustration, network node 106 is shown to be located between AN 104 and wireless network 108. However, network node 106 could alternatively be located within the backhaul of system 100. Network node 106 can be a standalone computing device, computing system, or network component, and can be accessible, for example, by a wired or wireless connection, or through an indirect connection such as through a computer network or wireless network. For example, network node 110 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 106 is not limited to any specific technology architecture, such as LTE, and can be used with any network architecture and/or protocol.

Communication network 108 can be a wired and/or wireless communication network, and can comprise processing nodes, routers, gateways, and physical and/or wireless data links for carrying data among various network elements, including combinations thereof, and can include a Local Area Network (LAN), a Wide Area Network (WAN), and an internetwork (including the Internet). Communication network 108 can be capable of carrying data, for example, to support voice, PTT, broadcast video, and data communications by a wireless device, for example, wireless devices 102, 102A, 102B, 102D, 102E. Wireless network protocols can comprise Code Division Multiple Access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof.

Communication links 110, 112, 114 can be wired or wireless and use various communication protocols such as Internet, Internet Protocol (IP), LAN, optical networking, Hybrid Fiber Coax (HFC), telephony, T1, or some other communication format—including combinations, improvements, or variations thereof. Wireless communication links can be a Radio Frequency (RF), microwave, infrared, or other similar signal, and can use a suitable communication protocol, for example, GSM, CDMA, WiMAX, or LTE, or combinations thereof. Other wireless protocols can also be used. Links 110, 112, 114 can be direct link or might include various equipment, intermediate components, systems, and networks.

Figure 2:
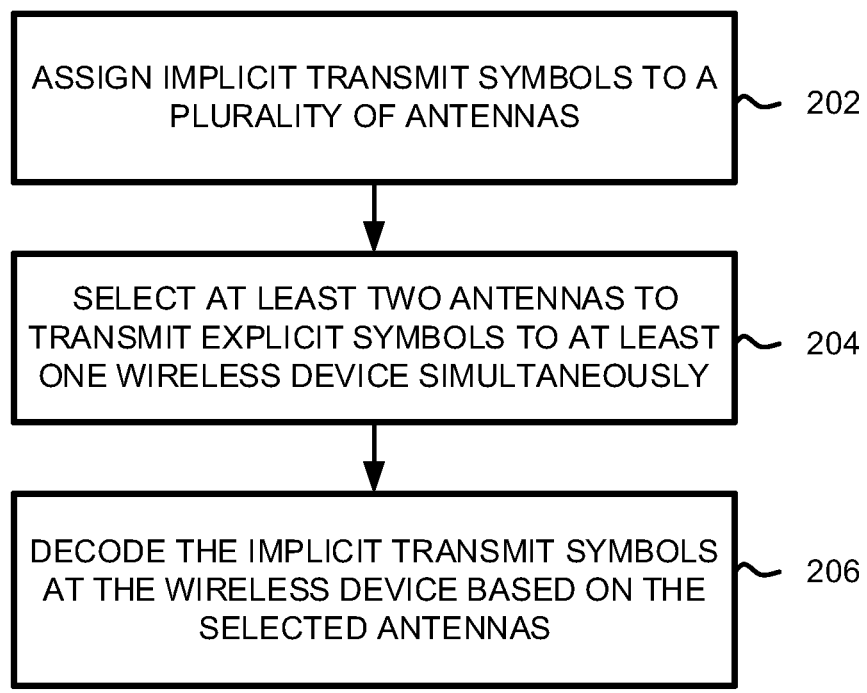
FIG. 2 illustrates a flow chart of an exemplary method for implementing an enhanced multi-antenna transmission scheme in a wireless network.

FIG. 2 illustrates a flow chart of an exemplary method for implementing an enhanced multi-antenna transmission scheme in a wireless network. The method will be discussed with reference to the exemplary communication system 100 illustrated in FIGS. 1A-1F. However, the method for implementing an enhanced multi-antenna transmission scheme illustrated in FIG. 2 can be implemented with any suitable communication system. In addition, although FIG. 2 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

Performance of spatial multiplexing and/or transmit diversity at AN 104 and/or wireless device 102 depends strongly on channel properties of the communication link (e.g., between ANs and/or wireless devices, etc.). Because Tx/Rx antennas deployed at AN 104 and/or wireless device 102 are (or can be) arbitrarily selected, AN 104 and/or wireless device 102 may select Tx/Rx antennas with degraded channel properties during sending (or transmission) of transmit signals (e.g., encoded data signals and/or explicit symbols) using different time and/or frequency resources. In such cases, decoding of the transmit signals at a receiver (e.g., AN 104 and/or wireless device 102) is likely to fail due to poor signal and/or noise conditions, which reduces overall network efficiencies and throughput. Referring to FIG. 1E, in an exemplary embodiment, AN 104E needs (or wants) to communicate (or transmit) implicit transmit symbols or bits to wireless device 102E, while the Tx/Rx antenna, which corresponds to the implicit transmit symbols or bits, is experiencing degraded channel properties due to multipath fading.

At 202, wireless network 108 may assign implicit transmit symbols or bits "00", "01", "10", "11" to a plurality of Tx/Rx antennas 0, 1, 2, 3 deployed at AN 104E and/or wireless device 102E. For example, operating under the assumption that wireless device 102E can detect (or determine) an origin (i.e., from which Tx/Rx antenna deployed at AN 104E a transmit signal originated) for explicit symbols A, B, C, and/or D, wireless network 108 via AN 104E may send implicit transmit symbols or bits "00", "01", "10", "11" to wireless device 102E based on implicit information the AN 104E wants (or needs) to communicate (or send) to wireless device 102E. Wireless network 108 via AN 104E can assign implicit transmit symbols or bits "00", "01", "10", "11" to and/or pre-configure each Tx/Rx antenna deployed at AN 104E and/or wireless device 102E such that selection of a Tx/Rx antenna by AN 104E to send explicit symbols A, B, C, and/or D carries implicit information (i.e., implicit transmit symbols or bits) for wireless device 102E of wireless network 108.

At 204, AN 104E selects at least two Tx/Rx antennas to simultaneously transmit explicit symbols A, B, C, and/or D to wireless device 102E of wireless network 108. For example, at different time intervals (e.g., period of time, at a given time, transmission time interval (TTI), etc.), AN 104E can select two or more Tx/Rx antennas to transmit explicit symbols A, B, C, and/or D that corresponds to implicit transmit symbols or bits "00", "01", "10", "11" AN 104E wants (or needs) to communicate (or send) to wireless device 102E. At $N^{th}$ time interval, AN 104E needs (or wants) to communicate (or transmit) implicit transmit symbols or bits "10" to wireless device 102E, but Tx/Rx antenna "2", which corresponds to the implicit transmit symbols or bits "10" AN 104E needs (or wants) to communicate to wireless device 102E, is experiencing degraded channel properties due to multipath fading. Thus, at: (i) $N^{th}$ time interval, AN 104E may use Tx/Rx antenna "1" to transmit explicit symbol "A" and implicit transmit symbols or bits "01" to wireless device 102E; and (ii) $(N)^{th}$ time interval, AN 104E may use Tx/Rx antenna "3" to transmit explicit symbol "B" and implicit transmit symbols or bits "11" to wireless device 102E. For example, AN 104E selects Tx/Rx antennas "1" and "3" as a "bit by bit" binary sum (i.e., {0,1}+{1,1}={1, 0}), which corresponds to implicit transmit symbols or bits "10" of Tx/Rx antenna "2".

At 206, wireless device 102E decodes the implicit transmit symbols or bits "01" and "11" based on the Tx/Rx antennas "1" and "3" selected by AN 104E. For example, on receipt of explicit symbols "A" and "B", wireless device 102E may determine that explicit symbols "A" and "B" were sent (or transmitted) by AN 104E from from Tx/Rx antennas "01" and "11". That is, when wireless network 108 assigns implicit transmit symbols or bits "00", "01", "10", "11" to and/or pre-configures each Tx/Rx antenna deployed at AN 104E and/or wireless device 102E, wireless network 108 can inform AN 104E and/or wireless device 102E of the assignment and/or configuration. Thus, on receipt of explicit symbols "A" and "B", wireless device 102E may decode the "bit by bit" binary sum (i.e., {0,1}+{1,1}={1,0}) associated with Tx/Rx antennas "1" and "3" such that wireless device 102E receives implicit transmit symbols or bits "10" associated with Tx/Rx antenna "2".

Figure 3:
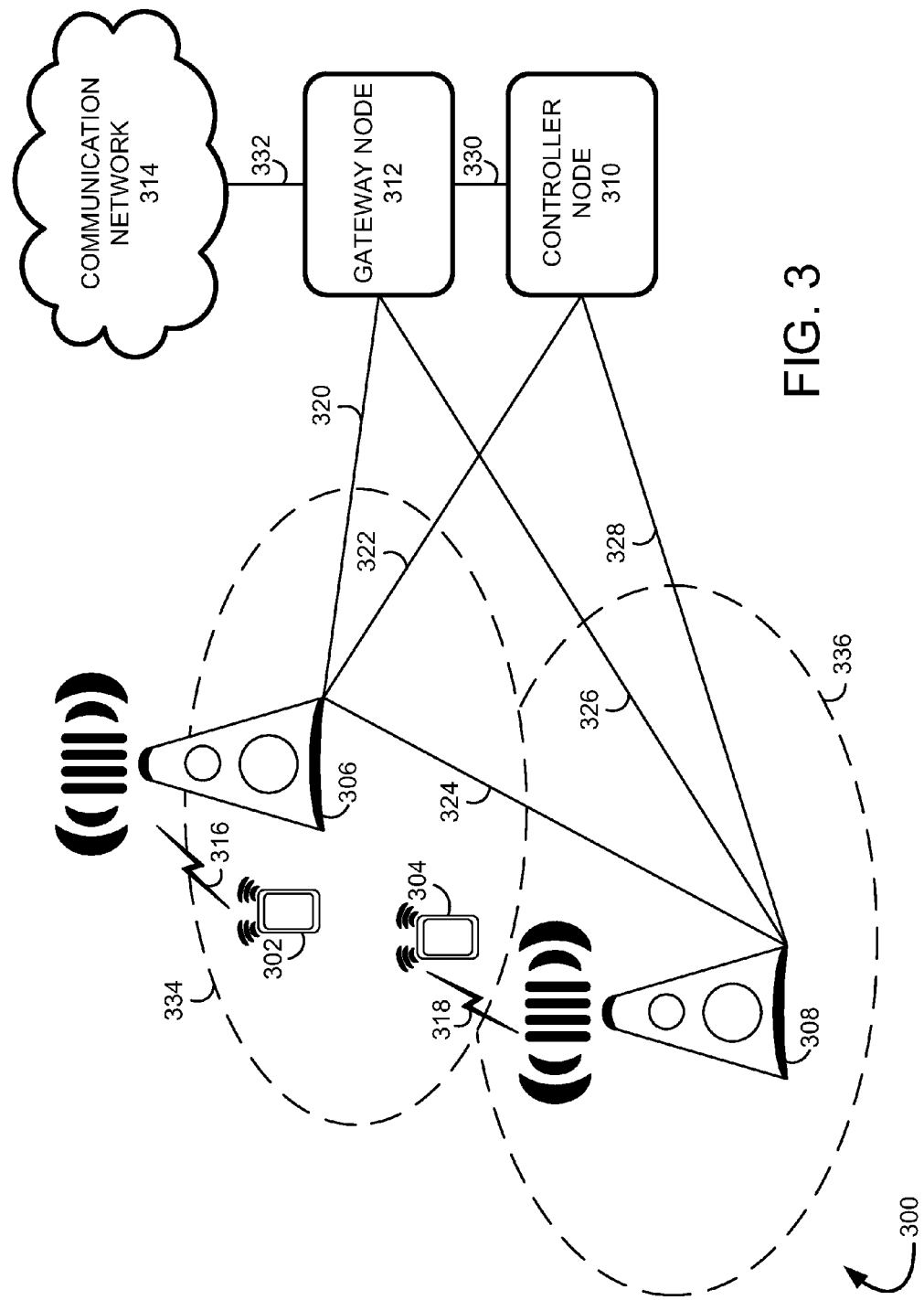
FIG. 3 illustrates another exemplary communication system for implementing an enhanced multi-antenna transmission scheme in a wireless network.

FIG. 3 illustrates another exemplary communication system for implementing an enhanced multi-antenna transmission scheme in a wireless network. System 300 can comprise wireless devices 302, 304, ANs 306, 308, controller node 310, gateway node 312, and communication network 314. ANs 306, 308 may include an inspection module (not shown). Alternatively, an inspection node (not shown) may be in the backhaul of system 300. The communications between wireless devices 302, 304 and/or ANs 306, 308 may be relayed, monitored, and/or inspected by the inspection module of ANs 306, 308 and/or inspection node.

Other network elements may be present in the communication system 300 to facilitate communication but are omitted for clarity, such as base stations, base station controllers, gateways, MSC, DPAs, and location registers such as a HLR or VLR. Furthermore, other network elements may be present to facilitate communication, such as between ANs 306, 308 and wireless network 314, which are omitted for clarity, including additional processing nodes, routers, gateways, and physical and/or wireless data links for carrying data among the various network elements.

Wireless devices 302, 304 can be any device configured to communicate over system 300 using a wireless interface. For example, wireless devices 302, 304 can include a remote terminal unit, a cell phone, a smart phone, a computing platform such as a laptop, palmtop, or a tablet, a PDA, or an internet access device, and combinations thereof. Wireless devices 302, 304 can include one or more transceivers (e.g., Tx/Rx antennas, illustrated in FIGS. 1B-1F) for transmitting and receiving data over system 300. Each transceiver can be associated with the same or different frequency bands, the same or different radio access technologies, the same or different network providers, and/or the same or different services. For example, Wireless devices 302, 304 can include Tx/Rx antennas that are associated with one or more of the following: CDMA, GSM, WiMAX, LTE, HSDPA, IEEE 802.11, WiFi, Bluetooth, Zigbee, IrDA, MBMS, etc.

Wireless devices 302, 304 can be connected with ANs 306, 308 through communication links 316, 318. Links 316, 318 can use various communication media, such as air, space, metal, optical fiber, or some other signal propagation path—including combinations thereof. Links 316, 318 may comprise many different signals sharing the same link. Links 316, 318 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless devices 302, 304 and ANs 306, 308 could share the same representative wireless link, but be transferred over different communication sessions, frequencies, timeslots, packets, ports, sockets, logical transport links, or in different directions—including combinations thereof.

Wireless devices 302, 304 can transmit and/or receive information over system 300 using various communication services. These services can include various voice, data, and/or MBMS services and applications. For example, mobile voice services, mobile data services, PTT services, internet services, web browsing, email, pictures, picture messaging, video, video messaging, broadcast video, audio, voicemail, music, MP3's, ring tones, stock tickers, new alerts, etc.

ANs 306, 308 can be any network node configured to provide communication between wireless devices 302, 304 and cellular network 314. ANs 306, 308 can be a standard AN or a short range, low-power AN. A standard AN can be a macrocell AN such as a base transceiver station, a radio base station, an eNodeB device, or an enhanced eNodeB device, or the like. A short range AN can include a microcell AN, a picocell AN, a femtocell AN, or the like such as a home NodeB or a home eNodeB device. Femtocell AN can be cellular AN or WiFi AN. In addition, a wireless device configured to enter a hotspot mode can be a femtocell AN. It is noted that while two ANs 306, 308 are illustrated in FIG. 3, any number of ANs can be implemented within system 300. Multiple Tx/Rx antennas may be deployed at ANs 306, 308 and/or wireless devices 302, 304 of wireless network 314. ANs 306, 308 may be configured to control the multiple Tx/Rx antennas using multiple antenna schemes/technologies to be adopted by wireless devices 302, 304, according to scheduling decisions (e.g., made at a scheduling module of ANs 306, 308 and/or other network element of wireless network 314). For example, ANs 306, 308 may communicate scheduling decisions (e.g., DL scheduling assignments) to wireless devices 302, 304 using Downlink Control Information (DCI) carried by a Downlink Control Channel (PDCCH). The DCI DL scheduling assignments may include, for example, Physical Downlink Shared Channel (PDSCH) resource indication, a transport format, hybrid-ARQ information, control information (e.g., related to multiplexing), command for power control of the Physical Uplink Control Channel (PUCCH), uplink scheduling grants, Physical Downlink Shared Channel (PUSCH) resource indication, transport format (e.g., an index to a predefined table of MCS, which may be QPSK, QAM16, QAM64, etc.), etc. ANs 306, 308 may further include, for example: a higher Media Access Control (MAC) stack module configured to schedule wireless devices 302, 304 based on Channel State Information (CSI) sent to ANs 306, 308 from wireless devices 302, 304 via the multiple Tx/Rx antennas; a lower MAC stack module configured to perform data handling functions (e.g., multiplexing, de-multiplexing, modulation, and/or de-modulation) of the transmit signals sent to ANs 306, 308 from wireless devices 302, 304 via the multiple Tx/Rx antennas; and, pre-coding stack module configured to transmit the multiple transmit signals from ANs 306, 308 to wireless devices 302, 304 based on a pre-coding weight (e.g., determined using Pre-Coding Matrix Information (PMI)) via the multiple Tx/Rx antennas. It is noted that while two ANs 306, 308 are illustrated in FIG. 3, any number of ANs can be implemented within system 300.

ANs 306, 308 can comprise a processor and associated circuitry to execute or direct the execution of computer-readable instructions to obtain information. ANs 306, 308 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. ANs 306, 308 can receive instructions and other input at a user interface.

Gateway node 312 can be any network node configured to interface with other network nodes using various protocols. Gateway node 312 can communicate user data over system 300. Gateway node 312 can be a standalone computing device, computing system, or network component, and can be accessible, for example, by a wired or wireless connection, or through an indirect connection such as through a computer network or cellular network. For example, gateway node 312 can include a Serving Gateway (SGW) and/or a Public Data Network Gateway (PGW), etc. One of ordinary skill in the art would recognize that gateway node 312 is not limited to any specific technology architecture, such as LTE and can be used with any network architecture and/or protocol.

Gateway node 312 can comprise a processor and associated circuitry to execute or direct the execution of computer-readable instructions to obtain information. Gateway node 312 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 312 can receive instructions and other input at a user interface.

Controller node 310 can be any network node configured to communicate information and/or control information over system 300. Controller node 310 can be configured to transmit control information associated with a handover procedure. Controller node 310 can be a standalone computing device, computing system, or network component, and can be accessible, for example, by a wired or wireless connection, or through an indirect connection such as through a computer network or cellular network. For example, controller node 310 can include a MME, a HSS, a PCRF, an AAA node, a RMS, a SPS, a policy server, etc. One of ordinary skill in the art would recognize that controller node 310 is not limited to any specific technology architecture, such as LTE and can be used with any network architecture and/or protocol.

Controller node 310 can comprise a processor and associated circuitry to execute or direct the execution of computer-readable instructions to obtain information. Controller node 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 310 can receive instructions and other input at a user interface.

AN 306 may be connected with gateway node 312 through communication link 320 and with controller node 310 through communication link 322. AN 306 may be connected with AN 308 through communication link 324. AN 308 may be connected with gateway node 312 through communication link 326 and with controller node 310 through communication link 328. Gateway node 312 may be connected with controller node 310 through communication link 330 and with communication network 314 through communication link 332. Links 320, 322, 324, 326, 328, 330, 332 can be wired or wireless and use various communication protocols such as Internet, IP, LAN, optical networking, HFC, telephony, T1, or some other communication format—including combinations, improvements, or variations thereof. Links 320, 322, 324, 326, 328, 330, 332 can be a RF, microwave, infrared, or other similar signal, and can use a suitable communication protocol, for example, GSM, CDMA, WiMAX, or LTE, or combinations thereof. Other wireless protocols can also be used. Links 320, 322, 324, 326, 328, 330, 332 can be a direct link or might include various equipment, intermediate components, systems, and networks. The communications between wireless devices 302, 304 and ANs 306, 308 and/or wireless network 314 may be relayed, monitored, and/or inspected by an inspection module at ANs 306, 308 and/or an inspection node.

Wireless network 314 can be a wired and/or wireless communication network, and can comprise processing nodes, routers, gateways, and physical and/or wireless data links for carrying data among various network elements, including combinations thereof, and can include a LAN or WAN, and an internetwork (including the internet). Wireless network 314 can be capable of carrying data, for example, to support voice, PTT, broadcast video, and data communications by a wireless device, such as wireless device 302, 304. Wireless network protocols can comprise MBMS, CDMA 1×RTT, GSM, UMTS, HSPA, EV-DO, EV-DO rev. A, 3GPP LTE, and WiMAX. Wired network protocols that may be utilized by wireless network 314 comprise Ethernet, Fast Ethernet, Gigabit Ethernet, Local Talk (such as Carrier Sense Multiple Access with Collision Avoidance), Token Ring, FDDI, ATM. Wireless network 314 can also comprise additional base stations, controller nodes, telephony switches, internet routers, network gateways, computer systems, communication links, or some other type of communication equipment, and combinations thereof.

Referring to FIG. 3, multiple Tx/Rx antennas (illustrated in FIGS. 1B-1F) may be deployed at ANs 306, 308 and/or wireless devices 302, 304 of wireless network to exploit multipath propagation behaviors and drastically increase spectral efficiencies through spatial multiplexing (i.e., enabling multiple Tx/Rx antennas at ANs 306, 308 and/or wireless devices 302, 304 to transfer data at a same time using separately encoded data signals and/or explicit symbols), which increases signal-capturing power and improves link reliability through the use of transmit diversity (i.e., explicit space-time or space frequency block coding to improve reliability of fading wireless links). The performance of spatial multiplexing and/or transmit diversity at ANs 306, 308 and/or wireless devices 302, 304 depends strongly on channel properties of a given communication link 316, 318 (e.g., between ANs 306, 308 and/or wireless devices 302, 304). Because Tx/Rx antennas deployed at ANs 306, 308 and/or wireless devices 302, 304 are (or can be) arbitrarily selected, ANs 306, 308 and/or wireless devices 302, 304 may select Tx/Rx antennas experiencing degraded channel properties during sending (or transmission) of transmit signals (e.g., encoded data signals and/or explicit symbols) using different time and/or frequency resources. In such cases, decoding of the transmit signals at a receiver (e.g., ANs 306, 308 and/or wireless devices 302, 304) is likely to fail due to poor signal and/or noise conditions, which reduces overall network efficiencies and throughput.

Figure 4:
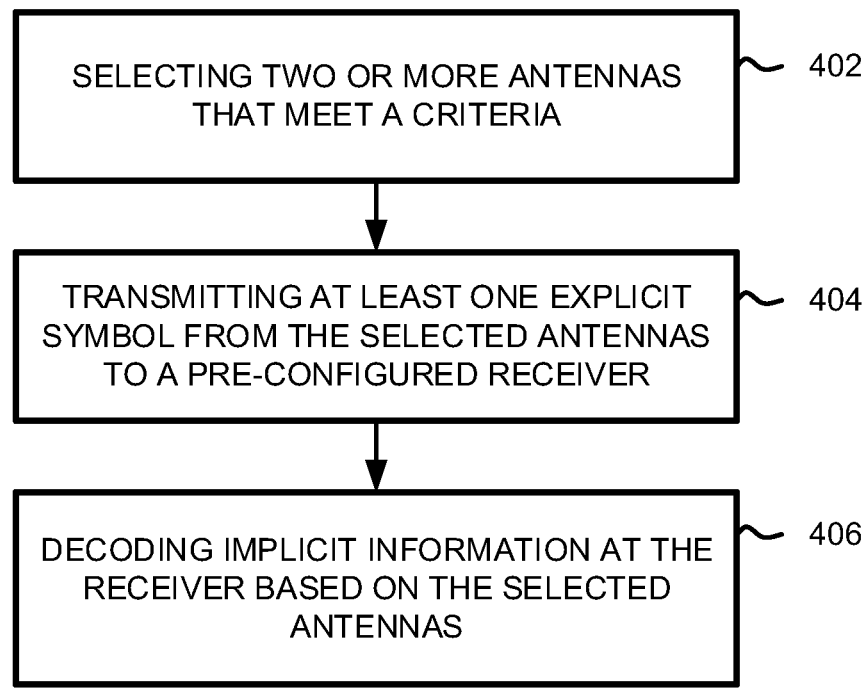
FIG. 4 illustrates another flow chart of an exemplary method for implementing an enhanced multi-antenna transmission scheme in a wireless network.

FIG. 4 illustrates a flow chart of an exemplary method for implementing an enhanced multi-antenna transmission scheme in a wireless network. The method will be discussed with reference to the exemplary system 300 illustrated in FIG. 3 and the exemplary ANs illustrated in FIG. 1F. But, the method for implementing an enhanced multi-antenna transmission scheme illustrated in FIG. 4 can be implemented in the exemplary system 100 illustrated in FIG. 1A, or with any suitable communication system. In addition, although FIG. 4 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

Referring to FIG. 4, multiple Tx/Rx antennas 0, 1, 2, 3 (illustrated in FIG. 1F) may be deployed at ANs 306, 308 and/or wireless devices 302, 304 of wireless network 314. Each Tx/Rx antenna 0, 1, 2, 3 provides a signal path from the transmitter (e.g., ANs 306, 308) to the receiver (e.g., wireless devices 302, 304); spectral efficiencies are obtained by splitting (or dividing) incoming transmit signals and/or data streams into multiple sub-streams and sending (or transmitting) each sub-stream on different Tx/Rx antennas 0, 1, 2, 3 to ANs 306, 308 and/or wireless devices 302, 304. For example, ANs 306, 308 and/or wireless devices 302, 304 may use one or more Tx/Rx antennas 0, 1, 2, 3 to transmit signals (e.g., encoded data signals and/or explicit symbols) using different time and/or frequency resources. The transmit signals may be "combined" on a same RB for UL transmission at Tx/Rx antennas 0, 1, 2, 3 of ANs 306, 308 (e.g., using spatial multiplexing) to maximize SINR, which effectively increases signal-capturing power (i.e., more bits per second per frequency range or Hz of bandwidth) at ANs 306, 308 and/or wireless devices 302, 304 to improve link quality and/or reliability (e.g., using transmit diversity). Operating under the assumption that the receiver (e.g., AN 306, 308 and/or wireless devices 302, 304) can detect (or determine) an origin (i.e., from which Tx/Rx antenna 0, 1, 2, 3 a given transmit signal originated) for each sent (or transmitted) symbol A, B, wireless network 314 via ANs 306, 308 and/or wireless devices 302, 304 may also send implicit information with the explicit symbols (or encoded data signals) from Tx/Rx antennas 0, 1, 2, 3. For example, wireless network 314 may pre-configure Tx/Rx antennas 0, 1, 2, 3 with implicit transmit symbols or bits "00", "01", "10", "11" and notify ANs 306, 308 and/or wireless devices 302, 304 of the configuration. Because Tx/Rx antennas 0, 1, 2, 3 are (or can be) arbitrarily selected, ANs 306, 308 and/or wireless devices 302, 304 may select Tx/Rx antennas "2" with degraded channel properties during sending (or transmission) of transmit signals. In such cases, decoding of the transmit signals at a receiver (e.g., ANs 306, 308 and/or wireless devices 302, 304) is likely to fail due to poor signal and/or noise conditions, which reduces overall network efficiencies and throughput. In an exemplary embodiment, ANs 306, 308 and/or wireless devices 302, 304 may need (or want) to communicate (or transmit) implicit transmit symbols or bits "10" to ANs 306, 308 and/or wireless devices 302, 304, while the Tx/Rx antenna "2", which corresponds to the implicit transmit symbols or bits "10", is experiencing degraded channel properties due to multipath fading.

At 402, ANs 306, 308 and/or wireless devices 302, 304 may select two or more Tx/Rx antennas 0, 1, 2, 3 that meet a criteria. For example, at different time intervals (e.g., period of time, at a given time, TTI, etc.), ANs 306, 308 and/or wireless devices 302, 304 may select two or more Tx/Rx antennas "1" and "3" to transmit explicit symbols "A" and "B" that correspond to implicit transmit symbols or bits "01" and "11" ANs 306, 308 and/or wireless devices 302, 304 need (or want) to communicate (or transmit) to ANs 306, 308 and/or wireless devices 302, 304. ANs 306, 308 and/or wireless devices 302, 304 select Tx/Rx antennas "1" and "3" as a "bit by bit" binary sum (i.e., {0,1}+{1, 1}={1,0}), which corresponds to implicit transmit symbols or bits "10" of Tx/Rx antenna "2".

At 404, ANs 306, 308 and/or wireless devices 302, 304 transmit at least one explicit symbol A, B, C, and/or D from the selected Tx/Rx antennas "1" and "3" to a pre-configured receiver (e.g., ANs 306, 308 and/or wireless devices 302, 304). For example, wireless network 314 may assign implicit transmit symbols or bits "00", "01", "10", "11" to and/or pre-configure each Tx/Rx antenna 0, 1, 2, 3 deployed at ANs 306, 308 and/or wireless devices 302, 304 and can inform ANs 306, 308 and/or wireless devices 302, 304 of the assignment and/or configuration. ANs 306, 308 and/or wireless devices 302, 304 may send explicit symbols "A" and "B" to pre-configured Tx/Rx antennas at ANs 306, 308 and/or wireless device 302, 306.

At 406, on receipt of the explicit symbols "A" and "B", ANs 306, 308 and/or wireless devices 302, 306 may decode the "bit by bit" binary sum (i.e., {0,1}+{1,1}={1,0}) associated with Tx/Rx antennas "1" and "3" such that ANs 306, 308 and/or wireless devices 302, 306 receive the implicit transmit symbols or bits "10" associated with Tx/Rx antenna "2".

While FIGS. 1D, 1F, and 2-4 are discussed with reference to a four Tx/Rx antenna ANs and/or wireless device, eight Tx/Rx antenna ANs and/or wireless devices may also be used. For example, an eight Tx/Rx antenna AN and/or wireless device may include eight Tx/Rx antennas 0, 1, 2, 3, 4, 5, 6, 7 and the wireless network via the AN may assign explicit symbols and/or implicit transmit symbols or bits "000", "001", "010", "011", "100", "101", "110", "111" to each Tx/Rx antenna. Multiple Tx/Rx antennas (e.g., Tx/Rx antennas "2", "5", and "7") can be simultaneously use for explicit symbol transmission.

Figure 5:
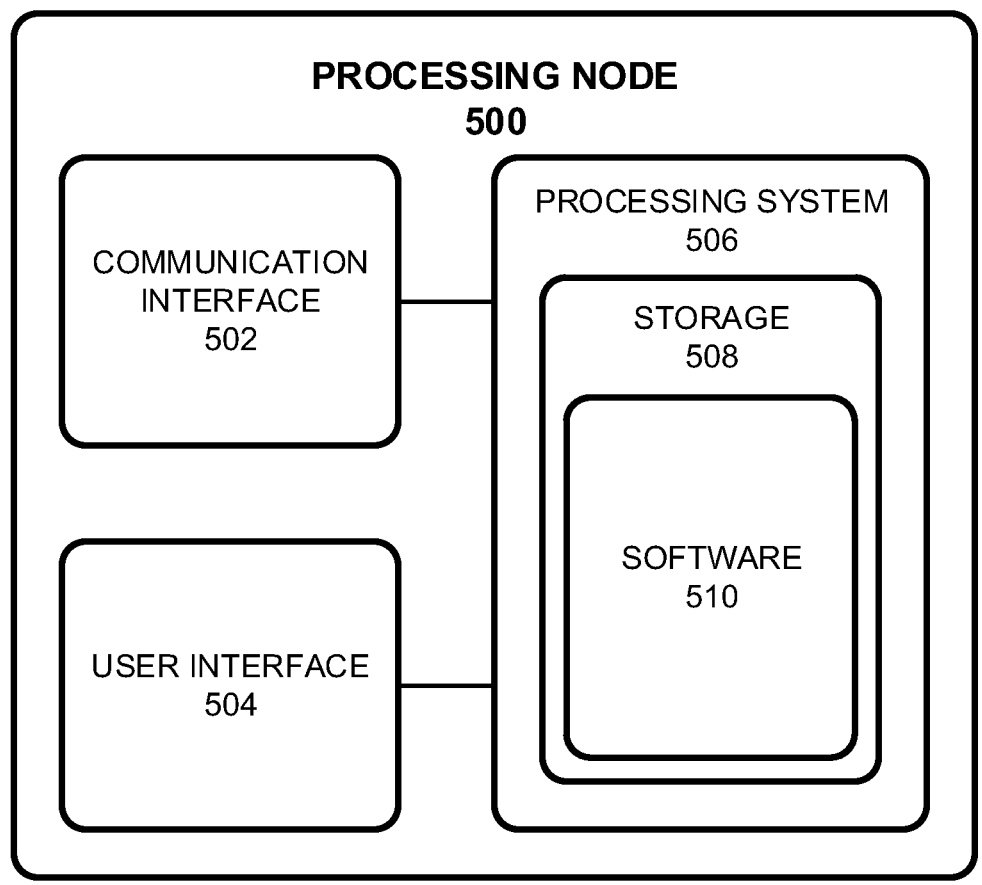
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication AN for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include ANs 104, 104A, 104B, 104C, 104D, 104E, 306, 308, network node 106, gateway node 312, and controller node 310, and inspection module and/or node (not shown). Processing node 500 can also be an adjunct or component of a network element, such as an element of ANs 104, 104A, 104B, 104C, 104D, 104E, 306, 308, network node 106, gateway node 312, and controller node 310, and inspection module and/or node (not shown). Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:
1. A method for enhanced multi-antenna transmission, the method comprising:
  assigning implicit transmit symbols to a plurality of antennas of the multi-antenna system;
  selecting at least two antennas from the plurality of antennas to simultaneously transmit explicit symbols to at least one wireless device; and
  instructing the at least one wireless device to decode the implicit transmit symbols based on the explicit symbols transmitted,
  wherein the at least two antennas are further selected based on a binary sum of the implicit transmit symbols assigned to the at least two antennas.

2. The method of claim 1, wherein the explicit symbols are assigned to each antenna of multi-antenna system.

3. The method of claim 2, wherein the explicit symbols are encoded data signals.

4. The method of claim 2, wherein the at least two antennas are selected based on the implicit transmit symbols a sender wants to communicate at the wireless device.

5. The method of claim 1, wherein at least one antenna of the plurality of antennas experiences multipath fading.

6. The method of claim 5, wherein the at least two antennas are selected based on the implicit transmit symbols assigned to the at least one antenna experiencing multipath fading.

7. The method of claim 6, wherein data signals transmitted from the at least two antennas are combined on a same resource block (RB) for uplink (UL) transmission.

8. A method for multi-antenna transmission, the method comprising:
  selecting two or more antennas of a multi-antenna system that meet a criteria;
  simultaneously transmitting at least one explicit symbol from the selected antennas to a pre-configured receiver; and
  decoding implicit information at the receiver based on the selected two or more antennas and the transmitted at least one explicit symbol,
  wherein the criteria is a binary sum of implicit information that equals a sum of implicit transmit symbols corresponding to at least one antenna of the multi-antenna system experiencing multipath fading.

9. A system for enhanced multi-antenna transmission, the system comprising:
  a processing node configured to:
  assign implicit transmit symbols to a plurality of antennas of the multi-antenna system;
  select at least two antennas from the plurality of antennas to simultaneously transmit explicit symbols to at least one wireless device; and
  instruct the wireless device to decode the implicit transmit symbols at the wireless device based on the explicit symbols transmitted,
  wherein the processing node is further configured to select the at least two antennas based on a binary sum of the implicit transmit symbols assigned to the at least two antennas.

10. The system of claim 9, wherein the at least two antennas are selected based on the implicit transmit symbols a sender wants to communicate at the wireless device.

11. The system of claim 10, wherein the explicit symbols are encoded data signals.

12. The system of claim 10, wherein the processing node is further configured to select the at least two antennas are selected based on the implicit transmit symbols a sender wants to communicate at the wireless device.

13. The system of claim 9, wherein at least one antenna of the plurality of antennas experiences multipath fading.

14. The system of claim 13, wherein the processing node is further configured to select the at least two antennas based on the implicit transmit symbols assigned to the at least one antenna experiencing multipath fading.

15. The system of claim 14, wherein data signals transmitted from the two or more antennas are combined on a same resource block (RB) for uplink (UL) transmission.

* * * * *